United States Patent [19]

Langer

[11] Patent Number: 5,341,369
[45] Date of Patent: Aug. 23, 1994

[54] MULTICHANNEL SELF-ROUTING PACKET SWITCHING NETWORK ARCHITECTURE

[75] Inventor: Richard M. Langer, Thousand Oaks, Calif.

[73] Assignee: Vitesse Semiconductor Corp., Camarillo, Calif.

[21] Appl. No.: 834,129

[22] Filed: Feb. 11, 1992

[51] Int. Cl.[5] .................. H04Q 11/04; H04L 12/56
[52] U.S. Cl. ......................................... 370/60; 370/94.1
[58] Field of Search ............. 370/55, 56, 58.1, 58.2, 370/58.3, 60, 60.1, 79, 84, 85.13, 91, 92, 93, 94.1, 110.1, 112, 118

[56] References Cited

U.S. PATENT DOCUMENTS

| | | | |
|---|---|---|---|
| 4,317,198 | 2/1982 | Johnson | 370/84 |
| 4,516,238 | 5/1985 | Huang et al. | 370/60 |
| 4,755,986 | 7/1988 | Hirata | 370/94.1 |
| 4,805,165 | 2/1989 | Kawamura et al. | 370/84 |
| 4,899,335 | 2/1990 | Johnson, Jr. et al. | 370/60 |
| 5,065,396 | 11/1991 | Castellano et al. | 370/84 |
| 5,099,475 | 3/1992 | Kozaki et al. | 370/60 |
| 5,113,392 | 5/1992 | Takiyasu et al. | 370/94.1 |

Primary Examiner—Douglas W. Olms
Assistant Examiner—Alpus H. Hsu
Attorney, Agent, or Firm—Irell & Manella

[57] ABSTRACT

A self-routing packet switching network architecture receives parallel incoming data packets and divides each of the corresponding bits within each data packet into words. The words are distributed into multiple transport channels, one word being placed into each channel in an alternating fashion. The words are transported through the channels and later words are input to the channels. Header words are also input to a self-routing network circuit. The self-routing network circuit determines the switching decisions to be made at each stage of a routing segment in order to properly route the words. Routing segments at the ends of the transport channels route the data according to these switching decisions. The use of multiple transport channels allows the network to operate internally at a reduced clock rate while still maintaining the same bandwidth as a direct bridge network architecture.

24 Claims, 5 Drawing Sheets

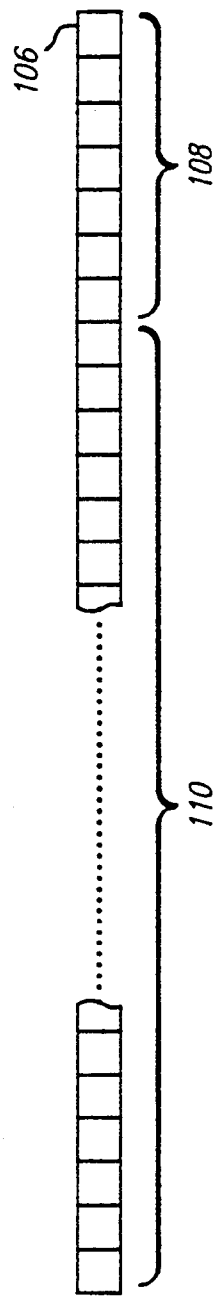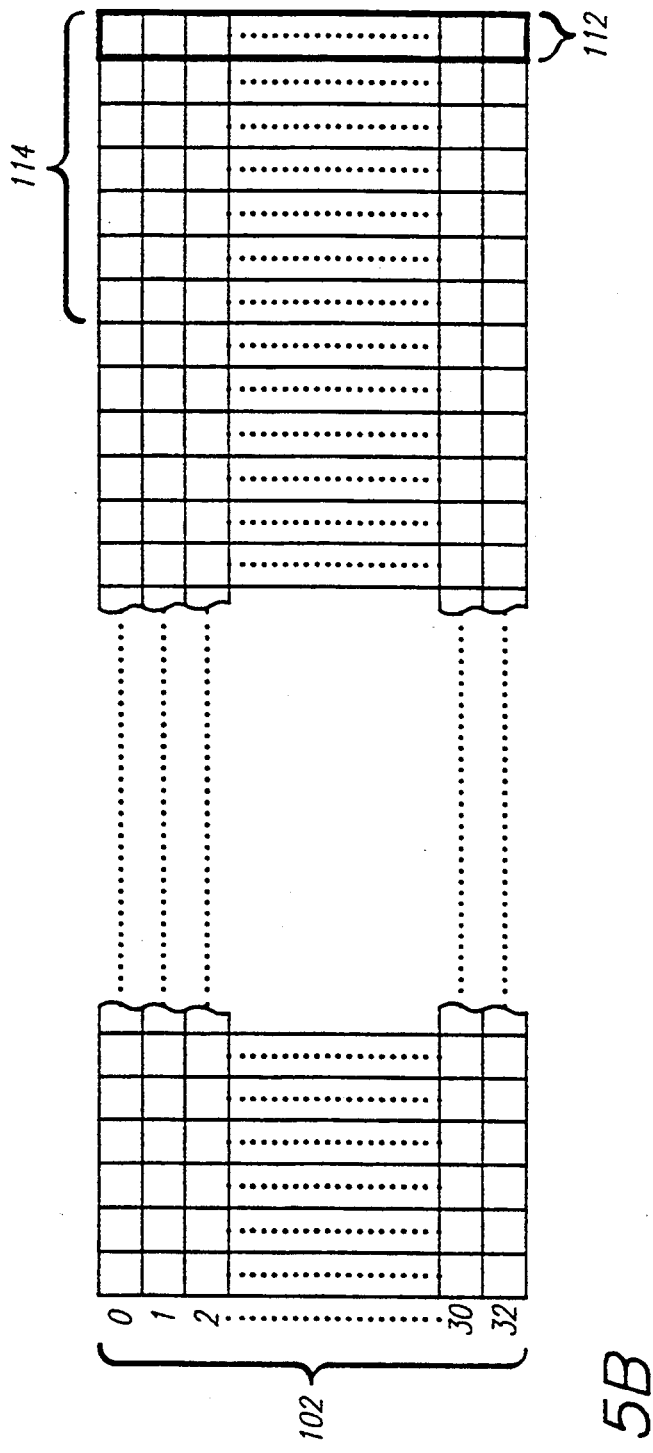
FIG. 5A
FIG. 5B

MULTICHANNEL SELF-ROUTING PACKET SWITCHING NETWORK ARCHITECTURE

FIELD OF THE INVENTION

This invention relates to self-routing packet switching networks. More particularly, the invention relates to an improved architecture for such networks which uses multiple channels to decrease the clock speed necessary to achieve a particular bandwidth.

BACKGROUND OF THE INVENTION

Packet switching networks are frequently relied on to direct information to specific destinations at high speeds. Such networks are frequently used in digital communications systems, such as telephone switching networks, and in parallel processing applications to communicate between processors.

A self-routing packet switching network is a packet switching network in which switch nodes within the network set themselves based on information contained in the incoming data. Referring to FIG. 1, a typical self-routing packet switching network is designated generally at 10. Incoming packets 12 comprise a header segment 14, which contains the intended destination of the packet 12, and a data segment 16 containing the data to be routed. The first bit of the header segment 14 is an activity bit which tells whether or not the packet is active. Each packet 12 is a serial stream of bits and each packet has the same length.

As shown in FIG. 1, the self-routing packet switching network 10 receives m packets concurrently 3, the packets concurrently entering the network 10 as parallel streams of sequential bits. The network 10 reads the header bits of the header segment 14 of each packet and routes the packet to the output line specified by those bits. Routing in this context is typically defined to include two functions, sorting and expanding. A typical self-routing packet switching network, such as the one shown in FIG. 1, includes both a sorting network 18 and an expanding network 20 to accomplish routing. The sorting network 18 simply orders the packets relative to one another based on the information in the header segment 14 of each packet 12. The expanding network 20 routes sorted packets to an actual physical destination. If some destinations are unused, the expanding network 20 routes the sorted packets around these unused destinations. Destination "2" in FIG. 1, designated at 24, is an example of an unused destination which the expanding network 20 routes packets around.

All self-routing packet switching networks make use of some self-routing algorithm to accomplish the sorting and expanding functions. A self-routing algorithm involves a series of comparisons of incoming bits, after which, if necessary, data lines are interchanged. Referring now to FIG. 2, a simple example of the way a sorting algorithm works is demonstrated by a network 30. The network 30 sorts header data on four input lines 34 into descending order (top to bottom) with six switching elements 41, 42, 43, 44, 45 and 46. A switching element that is schematically represented by an upward arrow within a circle indicates that the data on the two adjacent lines is switched if the data on the bottom line is larger than the data on the top line. Thus, such a switching element ensures that, after the switching element, the top line will contain data that is larger than the data on the bottom line. Conversely, a switching element that is schematically represented by an downward arrow within a circle indicates that the data on the two adjacent lines is switched if the data on the top line is larger than the data on the bottom line. Thus, such a switching element ensures that, after the switching element, the bottom line will contain data that is larger than the data on the top line.

In FIG. 2, exemplary inputs to the network 30, from top to bottom, are 2-1-4-3. A stage in a self-routing packet switching network comprises a vertical column of switching elements. The switching elements 41 and 42 comprise the first stage 51 of the network 30. The switching element 41 allows the data to pass through the adjacent lines without switching because the larger number is already on the top line. The switching element 42, however, interchanges the 4 and the 3 so that the larger data, the 4, is on the bottom line. The middle two inputs cross before a second stage 52, which compares the 2 and 3 (interchanging them), and the 1 and 4 (also interchanging them). This process is repeated at the final stage 53 so that the sorted output is 4-3-2-1.

A frequently used self-routing algorithm is known as the Batcher-Banyan algorithm. In a Batcher-Banyan sorting network handling n concurrent incoming packets, there are $(\log_2 n)(\log_2 n + 1)/2$ stages of switching elements.

An expanding network is also a complex series of comparisons and interchanges, similar to that of a sorting network. Together, the sorting and expanding networks make up the routing network, also known as the "fabric network." Many different algorithms have been used to make routing decisions, and all are well known to a person having ordinary skill in the art. Any of these algorithms, when implemented, produces a "fabric" of interconnections and ultimately result in the same output. Thus, although some algorithms may be more efficient than others, any fabric implementation of a self-routing algorithm can be used in a self-routing packet switching network.

Most self-routing packet switching networks use the self-routing fabric as a direct bridge between the incoming data and the routed output. A typical direct bridge configuration is shown in FIG. 3. In a direct bridge configuration, incoming data packets 60 are clocked directly through the self-routing fabric 62, comprised of a sorting network 64 and an expanding network 66. All of the data passes through the self-routing fabric 62, each bit of each packet one stage ahead of the following bit.

The direct bridge configuration presents problems in applications handling rapidly arriving data packets. The configuration requires that the switching in the self-routing fabric be done at the same clock speed as the input and the output to the network. Every switching element in the self-routing fabric must operate at this high clock rate. As the target input-output clock frequency of the network approaches the maximum speed of the technology utilized (such as CMOS, ECL, or GaAs), the manufacturing yield for the network is reduced. For any given single-chip network, it becomes increasingly unlikely that every switching element on the chip will be able to operate at the required speed. An exemplary network handling 32 concurrent packets with an 80 Gb/s bandwidth (the bandwidth of a network is the total number of bits per second entering and leaving the network) would have to operate at 2.5 GHz. The number of transistors required would only be on the order of 70,000, but there would be no time margins for these transistors. Thus, an unacceptably poor yield would be expected.

Another exemplary network can achieve the same 80 Gb/s bandwidth by using a slower 625 MHz clock and increasing the number of concurrent packets to 128. However, as the number of concurrent packets being routed increases, the quantity of switching elements required in the self-routing fabric increases rapidly. Thus, the use of 128 concurrent packets requires on the order of 400,000 transistors. Although there are no timing problems with such an architecture, this type of architecture requires an enormous number of transistors and is very costly.

The direct-bridge architecture presents the classic size versus speed trade-off. In high-speed applications, maximizing bandwidth is essential. However, conventional architecture, using a self-routing fabric network as a direct bridge between the input and output of the network, requires either vast numbers of transistors operating at reasonable speeds, or a more reasonable number of transistors straining to operate at high clock speeds. This latter method has the problem of unreasonably low manufacturing yields, due to the fact that the technology used limits the maximum clock rate that can be used.

Thus, there is a need for an architecture of a self-routing packet switching network that can operate internally at a clock speed lower than that of the network input and output, while at the same time not comprising a large additional number of transistors, while maintaining a high bandwidth.

SUMMARY OF THE INVENTION

The present invention is a network architecture which can operate at a lower internal clock speed than conventional direct bridge network architectures while attaining the same or an increased bandwidth. Further, the present invention achieves these results without a large increase in the number of transistors required.

The present invention contains a multichannel transport pipeline which allows data to be clocked through the transport pipeline at a slower clock rate than that required in a single channel network. A separate self-routing network circuit can take advantage of this reduced clock frequency, making all routing decisions at a slower rate than otherwise necessary. By decreasing the clock speed needed in the routing circuit, the bandwidth of a network operating at a given clock speed and having a given number of transistors can be increased. Alternatively, the multichannel approach allows a significant reduction in the hardware and/or routing circuit clock speed necessary to obtain a given bandwidth.

In the preferred embodiment of the present invention, an input demultiplexer is used to form words from the incoming packets. Each word contains one bit from each incoming packet, each bit within the same word having the same position within its corresponding packet as each other bit. These words are spread evenly into each of the multiple transport channels. Each transport channel consists of a series of offset registers which feed the words into a routing segment, which comprises a series of simple switching nodes. The words are shifted through the transport channels at a reduced frequency relative to the input clock frequency.

The words from the header segments of the incoming packets are read from the offset registers of the multiple transport channels and are sent through the stages of the self-routing network. The header words pass through each stage of the self-routing network one at a time. After each stage of switching elements within the self-routing network is set by the passing header words, a pass/cross register corresponding to that stage allows corresponding nodes of the routing segments to be set. The routing segment for each channel is identical to the other routing segments, and is a simple set of switches which can be set to duplicate the switching states of the routing fabric nodes.

Each stage of the self-routing network is completely set by the time the last header word passes through the stage. At that point the corresponding stage of the routing segments can be set to duplicate the fully-switched routing fabric nodes. Setting up of the routing segments can be delayed if required by synchronization adjustments. Thus, the data in the multiple transport channels passes through the routing segments which have been set to pass the data in the same way that the headers passed through the self-routing network. Thus, the data follows the same course in the routing segments as the header bits followed in the self-routing network.

The data output by the routing segment for each transport channel contains data which has been sorted by sorting the bits within each word, which was formed by from the incoming packets. The sorted words output from the routing segments are reassembled by an output multiplexer. By placing the sorted words together, the output multiplexer generates fully sorted and expanded packets.

The present invention provides significant advantages over the prior art. By increasing the number of transport channels, the internal clock speed can be reduced to a level acceptable for the technology desired.

BRIEF DESCRIPTION OF THE DRAWINGS

FIG. 5A is a schematic diagram of a single incoming data packet contained in a block of incoming data packets illustrated in FIG. 5B.

FIG. 5B is a schematic diagram of a block of incoming data packets entering the self-routing packet switching network architecture of the present invention.

DETAILED DESCRIPTION OF THE INVENTION

Figure 1:
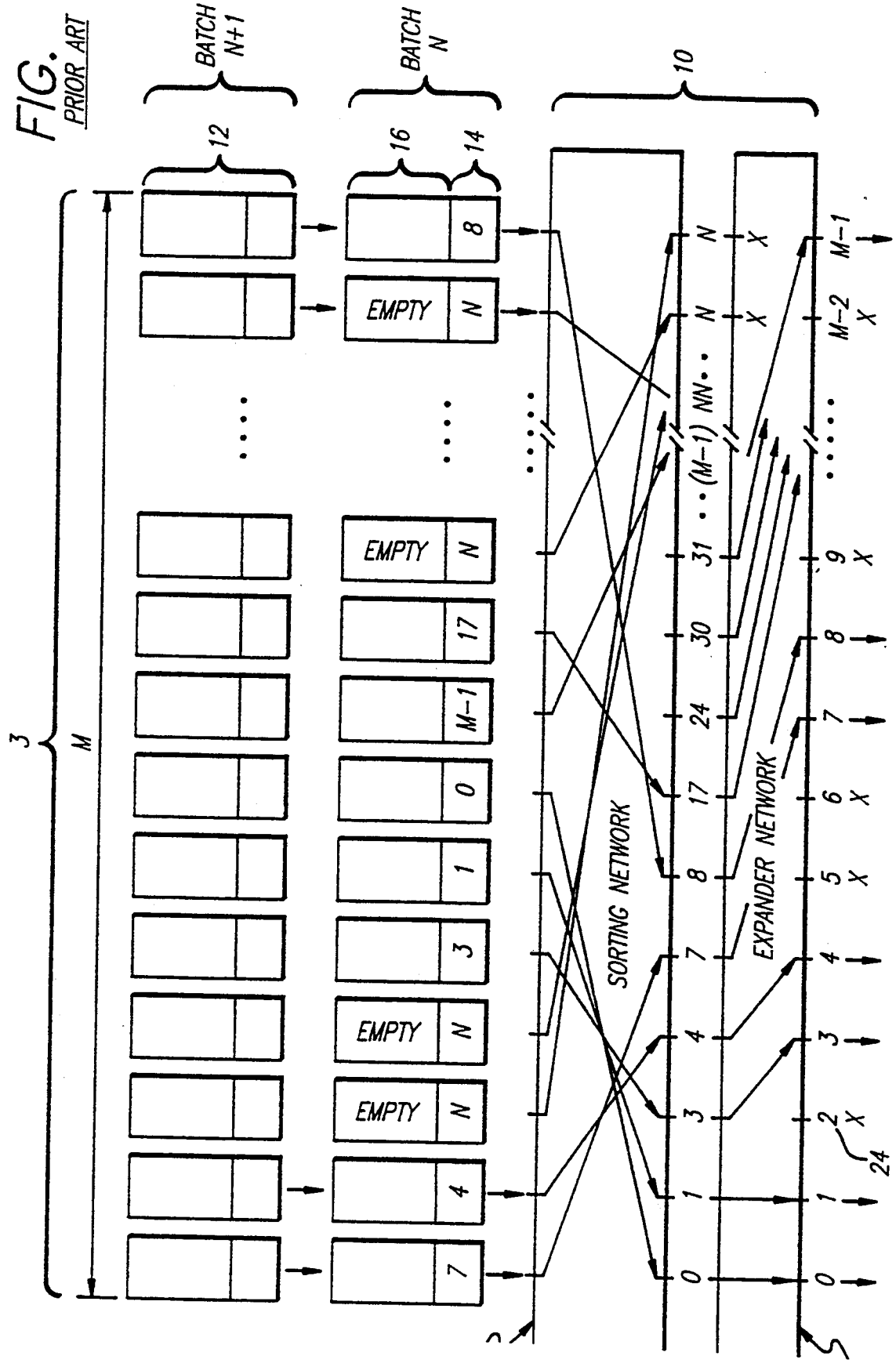
FIG. 1 is a block diagram of a typical self-routing packet switching network.
Figure 2:
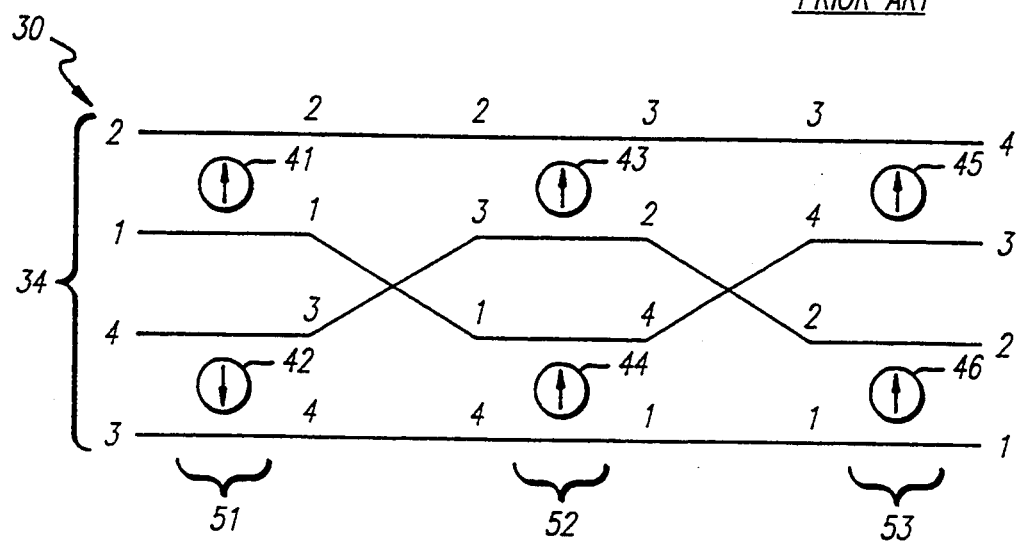
FIG. 2 is a diagram of an exemplary sorting network.
Figure 3:
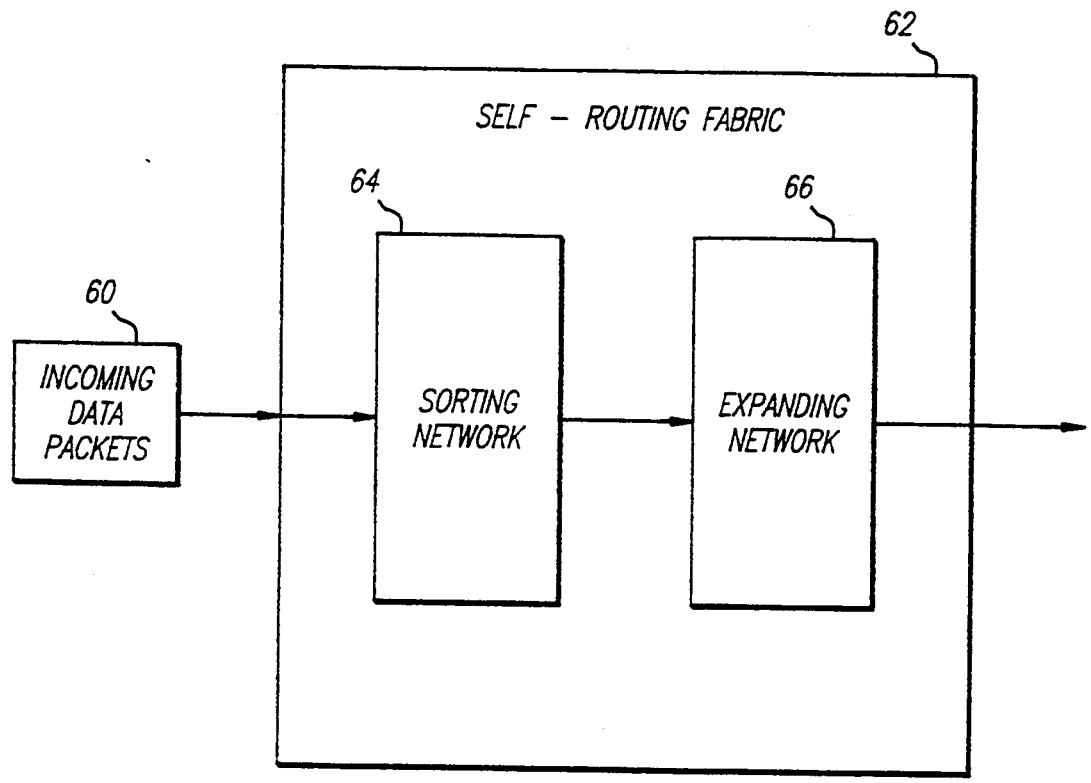
FIG. 3 is a block diagram of a typical direct bridge connection of a self-routing packet switching network.
Figure 4A:
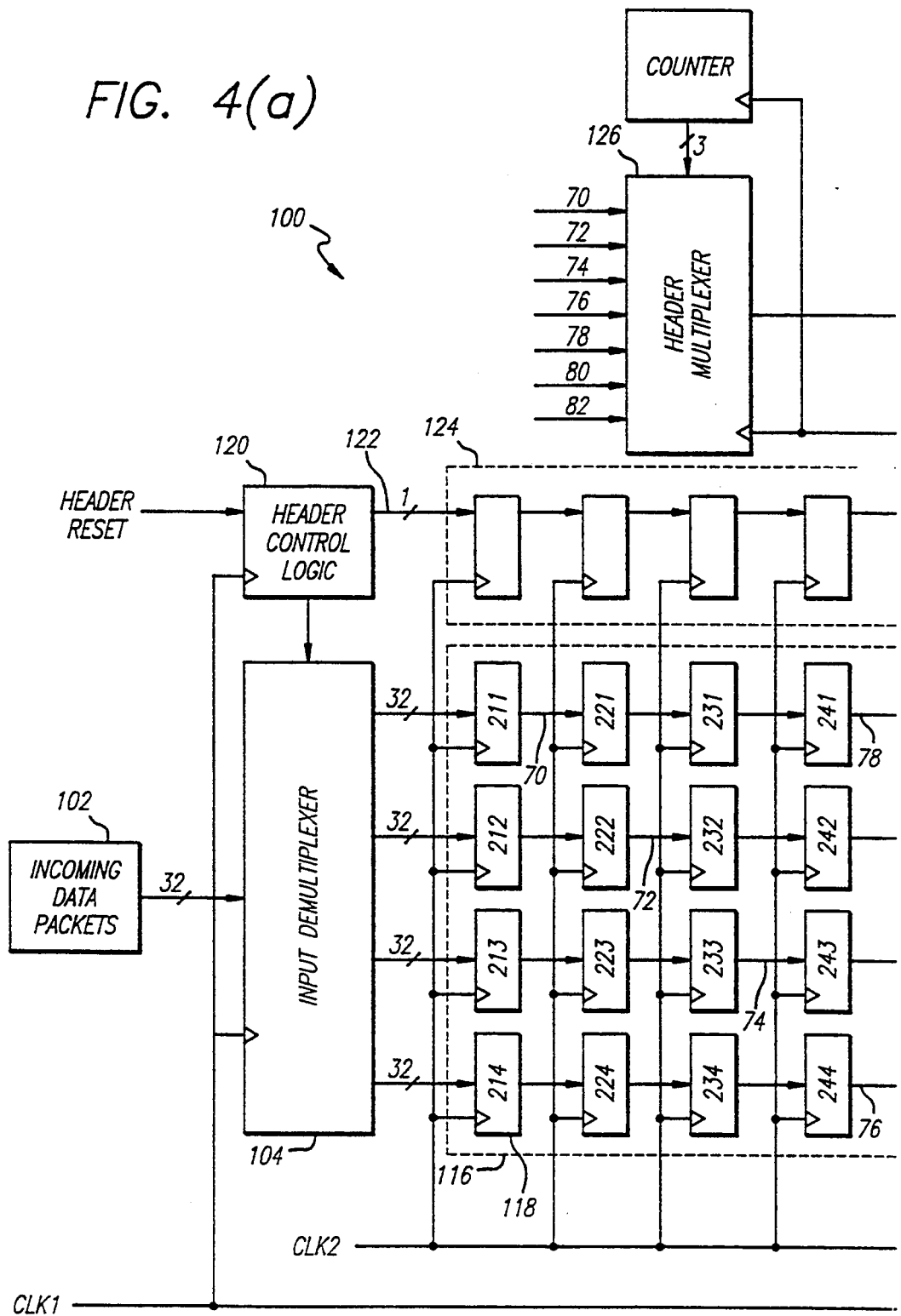
FIG. 4(a) and 4(b) are a block diagram of the multichannel self-routing packet switching network architecture of the present invention.
Figure 4B:
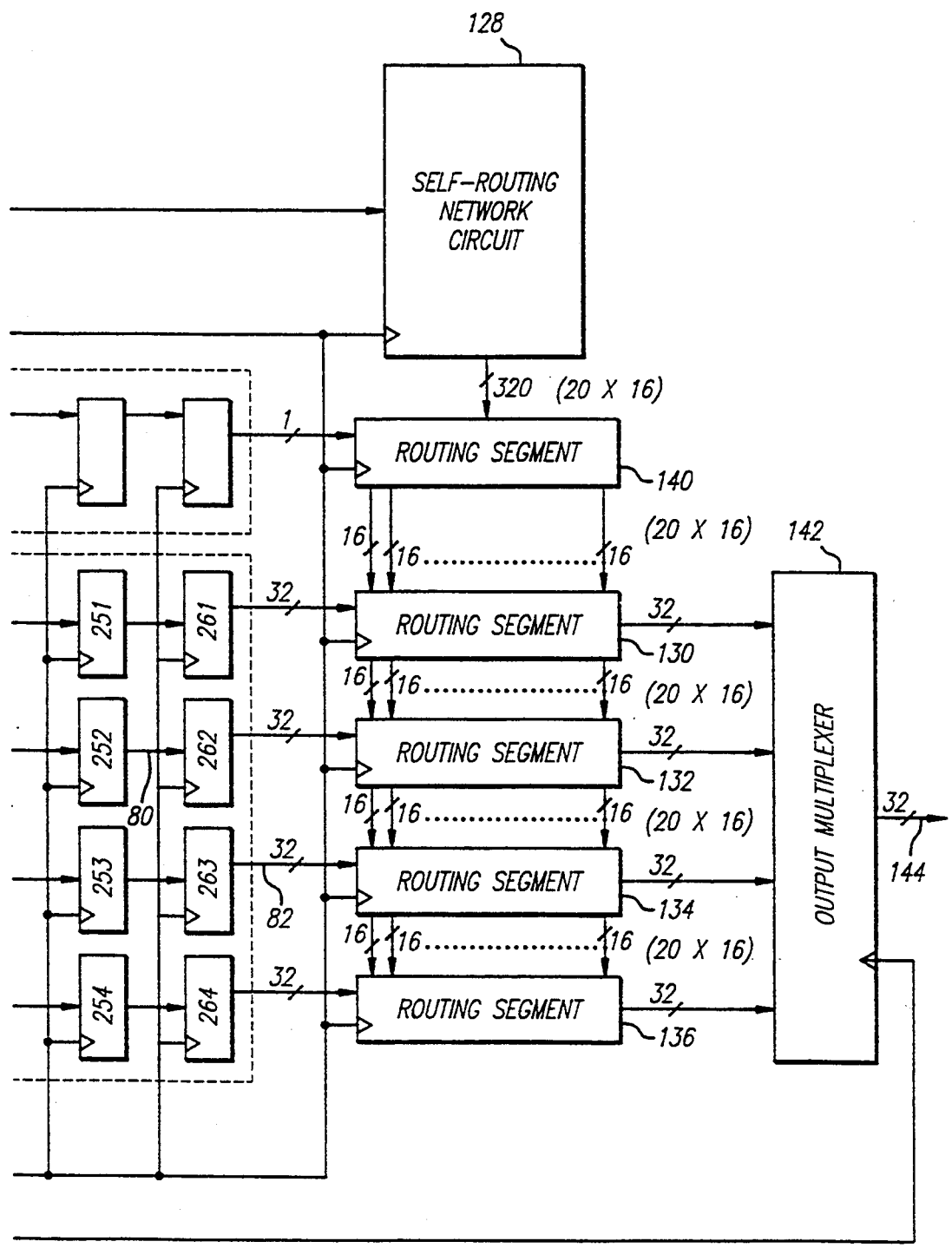

An exemplary embodiment of the self-routing packet switching network architecture of the present invention is shown in FIG. 4. A block 102 of concurrent incoming data packets enters a self-routing packet switching network 100, constructed in accordance with the network architecture of the present invention, through an input demultiplexer 104. The format of a single incoming data packet 106 is illustrated in FIG. 5A. The block 102 of incoming data packets is illustrated in FIG. 5B. Although the block 102 illustrated in FIG. 5B contains 32 incoming data packets, it will be apparent to one of ordinary skill in the art that the embodiment of the present invention shown in the drawings and described herein may be modified to accept any number of concurrent incoming data packets in one block.

Each incoming data packet 106 contains a header 108 and data 110. The information contained in the header 108 determines the final destination of the incoming data packet 106. In the exemplary embodiment illustrated in FIGS. 4, 5A and 5B, the header comprises 7 bits, 5 of which indicate one of the 32 possible final output destinations of the data packet 106. The other bits are a packet active bit and a broadcast bit.

Referring to FIG. 5B, the parallel bits in the parallel concurrent incoming data packets form 32-bit words. The first word is designated 112. The first seven words of the incoming data packets contain the seven header bits of each incoming data packet and comprise a header block 114. The data bits 110 of the incoming data packets similarly form 32-bit words across each incoming data packet.

Referring to FIG. 4, the input demultiplexer 104 directs each 32-bit word of the incoming data packets sequentially into each of a number of multiple transport channels 116. In the exemplary embodiment of FIG. 4, four transport channels are used. It will be apparent to one skilled in the art that any number of transport channels may be used.

The input demultiplexer 104 operates at the speed of a clock signal CLK1, which determines the bandwidth of the system. An exemplary bandwidth is 80 Gb/s which corresponds to a CLK1 frequency of 2500 MHz.

The transport channels 116 each consist of a series of offset registers 118, through which the words of the incoming data packets are shifted. The offset registers 118 shift their contents once to the right only after the input demultiplexer 104 has placed four words of the incoming data packets into the first offset register of all four channels. The offset registers 118 are clocked at a frequency determined by clock signal CLK2. The clock signal CLK2 is a lower frequency than the clock signal CLK1. The use of multiple transport channels 116 in the embodiment of the present invention allows the frequency of the clock signal CLK2 to be equal to the frequency of CLK1 divided by the number of transport channels used. Thus, if CLK1 is 2500 MHz, CLK2 is 625 MHz.

The input demultiplexer 104 is addressed by a header control logic 120, which is a counter operating at the frequency of CLK1. The header control logic 120 also generates a header control signal on a line 122. The header control signal indicates the beginning of a new set of concurrent incoming data packets. The line 122 leads into a chain of single bit registers 124 through which the header control signal is passed. The header control signal serves to mark the forward progress of the header words through the offset registers 118. For example, when the header control signal is in the third of the single bit registers 124, this indicates that the third column of offset registers contains the first word of a new set of incoming packets.

A header multiplexer 126, or a memory device, is used to feed the header words into a self-routing network circuit 128, after reading the header words from the appropriate offset registers. Each header word, beginning with the first, is sequentially fed into the network circuit 128. After all of the header words have entered the network circuit 128, no more information will be sent to the network circuit 128 until the next set of incoming data packets arrives.

There are many different ways in which the header words can be picked up from the offset registers. One simple way is described here. Let $t_1$ represent the time at which the header control logic 120 sends a signal to the input demultiplexer 104 indicating that a new set of incoming data packets has arrived. The input demultiplexer 104 then places the first header word into offset register 211, the second header word into offset register 212, the third header word into offset register 213, and, finally, the fourth header word into offset register 214. At time $t_2$, immediately after offset register 214 is filled, the clock signal CLK2, causes the contents of the offset registers 211, 212, 213, and 214 to be shifted to the right. Thus, after $t_2$, the data previously held in those offset registers is shifted into offset registers 221, 222, 223, and 224. The process is repeated as offset registers 211, 212, 213 and 214 are refilled with header and then data words and shifted to the right. In this manner, the data is transported down the multiple transport channels 116 at the clock frequency of CLK2, which is one fourth as fast as the input data is arriving. Because this process is repeated, it is easy to tell where each of the header words will be at any given time. Immediately after $t_1$ ($t_{1+}$, indicating a time immediately after t1, but before t2), the first header word will be in offset register 211. At $t_{2+}$, the second header word will be in offset register 222. At $t_{3+}$, the third header word will be in offset register 233. At $t_{4+}$, the fourth header word will be in offset register 244. At $t_{5+}$, the fifth header word will be in offset register 241. At $t_{6+}$, the sixth header word will be in offset register 252. Finally, at $t_{7+}$ the last header word will be in offset register 263, just as the first four header words enter routing segments 130, 132, 134 and 136.

As can be seen from this example, if the header words are read from the offset registers in the multiple transport channels 116, then each transport channel must contain enough offset registers to ensure that all of the header words can be fed from the offset registers into the self-routing network circuit 128 before first data words of the incoming packets enter the routing segments 130, 132, 134 and 136. Alternatively, a memory device could be used to store the header words and input the header words into the self-routing network circuit 128.

As the header words progress through the self-routing network circuit 128, the switching elements at each stage are set. A common implementation of a self-routing network circuit is a Batcher-Banyan method. In the exemplary embodiment of the present invention, the self-routing network circuit 128 incorporates the well-known Batcher-Banyan method. This method requires a total of 320 switching elements to fully sort and expand 32 concurrent incoming packets. Each of these switching elements is set to either pass two lines directly through or interchange them. The states (pass or interchange) of the 320 switching nodes are communicated to simplified switches in the routing segments 130, 132, 134 and 136, which duplicate the path the headers followed through the self-routing network circuit 128.

However, the switching elements corresponding to a particular stage of the self-routing network circuit 128 do not affect the corresponding stage in the routing segments 130, 132, 134 and 136 until the last of the header bits have passed that stage of the self-routing network circuit 128. This is accomplished by the pass/cross registers 140 through which the header control signal passes from the chain of single bit registers 124. Each of the 20 pass/cross 16-bit registers 140 corresponds to one stage of switching elements in the self-routing network circuit 128. As the last header word of a set of incoming packets passes through a stage of the self-routing network circuit 128, that stage is fully set. At that time, the header control bits enter the 16-bit pass/cross register corresponding to that stage, allowing the corresponding stage of the routing segments 130, 132, 134 and 136 to be set. At the same time, the words begin to enter the same stage of the routing segments. Thus, as the words arrive at each stage of the routing segments 130, 132, 134 and 136, the switching nodes of that stage are set to pass the words in the same way the corresponding nodes of the self-routing network circuit 128 passed the header words. The words follow the same course through the routing segments that the header words followed, only a few clock cycles before, in the self-routing network circuit 128. The front ends of the pass/cross registers 140 and routing segments 130, 132, 134, 136 provide additional delay to precisely align the routing signals coming from the self-routing network circuit 128 and the data packets coming from the offset registers 118.

Because a self-routing network is often composed of many stages of switching elements, it will take multiple clock cycles for the data to pass through the routing segments, which have an equal number of stages. Thus, it may take many more clock cycles for the data to travel through the routing segments than it took moments earlier to move through the offset registers. In the Batcher-Banyan example, it will take a minimum of 20 CLK2 clock cycles until the first of the sorted data words is ready at the outputs of the routing segments 130, 132, 134 and 136. The number of clocks cycles required for the data to pass through the routing segments can be longer than 20 CLK2 clock cycles, depending on the sorting/expanding nodes implementation and the length of the offset register chains. As the sorted words leave the routing segments 130, 132, 134 and 136, the bits within each word have been properly interchanged with respect to one another according to the paths taken by the header words in the self-routing network circuit.

An output multiplexer 142 sequentially places the words at an output 144, thereby reassembling the data into fully sorted and expanded output packets. It is easy to illustrate how this reassembly works. The bits of every word have been rearranged in exactly the same way, since every word passed through one of several identical routing segments. These bits will be sequentially ordered and expanded. Each internally rearranged word arrives at the output multiplexer 142 on the same channel that it entered from the input demultiplexer 104. Thus, the first header word (with all internal bits ordered and expanded) would be the first word to emerge from the routing segment 130. At the same time, the second, third, and fourth words would emerge from the routing segments 132, 134 and 136, respectively. The output multiplexer 142 would take the first word from the routing segment 130 and maps the bits to their corresponding output line. Thus, the first bit of every outgoing packet is placed at the proper output destination for that particular bit's packet. The output multiplexer 142 then takes the second word from the routing segment 132 and places it at the output. This is repeated until the fourth word has been taken from the routing segment 136. At this point, the data in the transport channels shifts to the right and four new words emerge from the routing segments. The process is repeated continuously, so that all the data entering the network is routed and placed at the output as concurrent outgoing data packets.

It can be seen that the self-routing packet switching network architecture of the present invention provides a self-routing packet switching network which can operate at a clock speed lower than that of a network having a direct bridge architecture, while maintaining the same bandwidth. The reduced clock speed allows greater flexibility with the design of component transistors.

Also, the network architecture of the present invention requires fewer transistors than would be required by using a direct bridge network architecture handling more concurrent incoming packets to achieve the same bandwidth as the present invention at the same clock speed. In the present invention, the only extra transistors required are for the input demultiplexer 104, multiplexers 126 and 142, pass/cross registers 140, the additional routing segments 132, 134 and 136, and the additional control logic. The self-routing network circuit 128 is not expanded, as it would be if a direct bridge network architecture handling a greater number of concurrent incoming data packets were used.

We claim:

1. A method for reducing the clock frequency necessary to route data through a self-routing packet switching network at a given bandwidth, said given bandwidth determining a clock rate at which the data to be routed enters and the routed data exits said self-routing packet switching network, said method comprising the steps of:

distributing the data to be routed among a plurality of channels;

transporting said distributed data through each of said plurality of transport channels at a reduced clock rate substantially equal to said entering and exiting clock rate divided by the number of said plurality of transport channels;

routing said distributed data through a self-routing fabric at said reduced clock rate; and reassembling said routed data at the output of said network at said entering and exiting clock rate.

2. The method as recited in claim 1, wherein said self-routing fabric further comprises a self-routing network circuit and wherein the data to be routed is organized into packets, each of said packets comprising a header portion and a data portion, and wherein said transporting step further comprises the step of transmitting said header portion of said data packets to said self-routing network circuit.

3. The method as recited in claim 2, wherein said routing step further comprises the steps of:

determining the destinations of said distributed data by routing said header portion of each of said packets through said self-routing network circuit at said reduced clock rate; and reordering said distributed data in each of said plurality of transport channels at said reduced clock rate according to said routing determinations made by said self-routing network circuit.

4. The method as recited in claim 3, wherein said step of distributing the data to be routed further comprises:

receiving the data serially as a fixed number of said data packets of identical length, said fixed number of said packets received in parallel, said data portion of each of said packets containing the same number of data bits and said header portion of each of said packets containing the same number of header bits;

splitting said received data packets into words, each of said words containing one bit from each of said received packets, each of said one bits occupying the same serial position in each of said received packets; and inputting said words sequentially into one of said plurality of transport channels in an alternating fashion.

5. The method as recited in claim 4, wherein said self-routing fabric further comprises a plurality of routing segments, each of said channels coupled to at least one of said plurality of routing segments, and wherein said step of reordering said distributed data in each of said plurality of transport channels according to said routing determinations made by said self-routing network circuit further comprises the steps of:

communicating the states of switching nodes in said self-routing network circuit to said plurality of routing segments; and setting switching nodes in said plurality of routing segments to duplicate said communicated states of said self-routing network circuit so that the data bits of said data portion of one of said packets passing through said plurality of routing segments can be reordered in the same way as the header bits of said header portion of said one of said packets were reordered by said self-routing network circuit.

6. The method as recited in claim 4, wherein said distributing step further comprises the step of generating a header control signal to mark the beginning of a new set of said received data packets.

7. The method as recited in claim 6, wherein said apparatus further comprises at least one header channel for transporting said header control signal, and wherein said transporting step further comprises the step of transporting said header control signal in said at least one header channel to mark the forward progress of said words comprising said header bits in said plurality of transport channels.

8. The method as recited in claim 3, wherein said step of transporting said distributed data through each of said plurality of transport channels further comprises the step of shifting said distributed data in each of said plurality of transport channels through a series of offset registers at said reduced clock rate.

9. A self-routing packet switching apparatus for reducing the clock frequency necessary to route data through said apparatus at a given bandwidth, said given bandwidth determining a clock rate at which the data to be routed enters and the routed data exits said apparatus, said apparatus comprising:

means for distributing the data to be routed among a plurality of transport channels;

means for transporting said distributed data through each of said plurality of transport channels at a reduced clock rate substantially equal to said entering and exiting clock rate divided by the number of said plurality of transport channels;

a self-routing fabric means for routing said distributed data at said reduced clock rate, said self-routing fabric means coupled to said plurality of transport channels; and means for reassembling said routed data at the output of said apparatus at said entering and exiting clock rate.

10. The apparatus as recited in claim 9, wherein said self-routing fabric means further comprises a self-routing network circuit, and wherein the data to be routed is organized into packets, each of said packets comprising a header portion and a data portion, and wherein said means for transporting further comprises means for transmitting said header portion of said data packets to said self-routing network circuit.

11. The apparatus as recited in claim 10, wherein said self-routing fabric means further comprises:

means for determining the destinations of said distributed data by routing said header portion of each of said packets through said self-routing network circuit at said reduced clock rate; and means for reordering said distributed data in each of said plurality of transport channels at said reduced clock rate according to said routing determinations made by said self-routing network circuit.

12. The apparatus as recited in claim 11, wherein said means for distributing the data to be routed further comprises:

means for receiving the data serially as a fixed number of said data packets of identical length, said fixed number of said packets received in parallel, said data portion of each of said packets containing the same number of data bits and said header portion of each of said packets containing the same number of header bits;

means for splitting said received data packets into words, each of said words containing one bit from each of said received packets, each of said one bits occupying the same serial position in each of said received packets; and means for inputting said words sequentially into one of said plurality of transport channels in an alternating fashion.

13. The apparatus as recited in claim 12, wherein said means for reordering said distributed data in each of said plurality of transport channels according to said routing determinations made by said self-routing network circuit further comprises:

a plurality of routing segments, each of said plurality of transport channels coupled to at least one of said plurality of routing segments;

means for communicating the states of switching nodes in said self-routing network circuit to said plurality of routing segments; and means for setting switching nodes in said plurality of routing segments to duplicate said communicated states of said self-routing network circuit so that the data bits of said data portion of one of said packets passing through said plurality of routing segments can be reordered in the same way as the header bits of said header portion of said one of said packets were reordered by said self-routing network circuit.

14. The apparatus as recited in claim 12, wherein said means for distributing further comprises a means for generating a header control signal to mark the beginning of a new set of said received data packets.

15. The apparatus as recited in claim 14, wherein said means for transporting further comprises at least one header channel for transporting said header control signal to mark the forward progress in said plurality of transport channels of said words comprising said header bits.

16. The apparatus as recited in claim 11, wherein said means for transporting said distributed data through each of said plurality of transport channels further comprises a means for shifting said distributed data in each of said plurality of transport channels through a series of offset registers at said reduced clock rate.

17. An apparatus for routing data at a given bandwidth, said bandwidth defining a clock rate at which the data to be routed enters said apparatus and the routed data exits said apparatus, said apparatus comprising:
   an input demultiplexer having a plurality of inputs coupled to a source of the data to be routed;
   a transport pipeline having a plurality of inputs coupled to a plurality of outputs of said input demultiplexer;
   a self-routing fabric having a plurality of inputs coupled to a plurality of outputs of said transport pipeline;
   an output multiplexer having a plurality of inputs coupled to a plurality of outputs of said self-routing fabric, said output multiplexer having an output over which the routed data exits said apparatus; and
   wherein said input demultiplexer and said output multiplexer are coupled to a clock source operating at said entering and exiting clock rate, and wherein said transport pipeline and said self-routing fabric are coupled to a clock source operating at a reduced clock rate which is substantially less than said entering and exiting clock rate.

18. The apparatus as recited in claim 17 wherein the data to be routed is organized into packets, wherein said transport pipeline comprises a plurality of channels, and wherein said reduced clock rate is substantially equal to said entering and exiting clock rate divided by the number of said plurality of channels.

19. The apparatus as recited in claim 18 wherein each of said plurality of channels comprises a plurality of shift registers connected in series, inputs of the first of said series for each channel coupled to one of said plurality of outputs of said input demultiplexer, outputs of the last of said series for each channel coupled to an input of said self-routing fabric.

20. The apparatus as recited in claim 19 wherein said input demultiplexer serially receives a fixed number of said packets in parallel over a fixed number of inputs, said input demultiplexer forming words comprising one bit from each of said received packets, each said one bit occupying the same serial bit position in said received packets, said input demultiplexer inputting one of said words into each of the first of said series for each channel at said entering and exiting rate, said words advancing through the remainder of said series for each channel at said reduced clock rate.

21. The apparatus as recited in claim 18 or claim 20 wherein said packets further comprise a data portion and a header portion, and wherein said self-routing fabric further comprises:
   a self-routing network circuit;
   a means for providing said header portion of each of said packets to said self-routing network circuit, said header portion defining the destinations of the data comprising said data portion, said means for providing coupled between at least one of said plurality of channels and said self-routing network circuit;
   a plurality of routing segments each having an input coupled to one of said plurality of channels, each of said plurality of routing segments having an output coupled to said output multiplexer; and
   a plurality of pass/cross registers, coupled between said self-routing network circuit and said plurality of routing segments, to program said plurality of routing segments in accordance with destinations determined by said header portions of said packets.

22. The apparatus as recited in claim 21 wherein said means for providing said header portion comprises a multiplexer and a counter coupled to said multiplexer to sequentially select an appropriate one of said plurality of channels as a source of said header portion.

23. The apparatus as recited in claim 21 wherein said means for providing said header portion comprises a memory and a means for addressing said memory to sequentially select an appropriate one of said plurality of transport channels as a source of said header portion.

24. The apparatus as recited in claim 21 wherein said input demultiplexer further comprises a header control circuit having a control output to indicate when a new set of said fixed number of packets has been received, and wherein said transport pipeline further comprises a chain of single bit registers coupled to said header control circuit to transport said control output to said pass/cross registers.

* * * * *